(No Model.)
I. HARMANSON.
BRIDLE BIT.
No. 571,563. Patented Nov. 17, 1896.
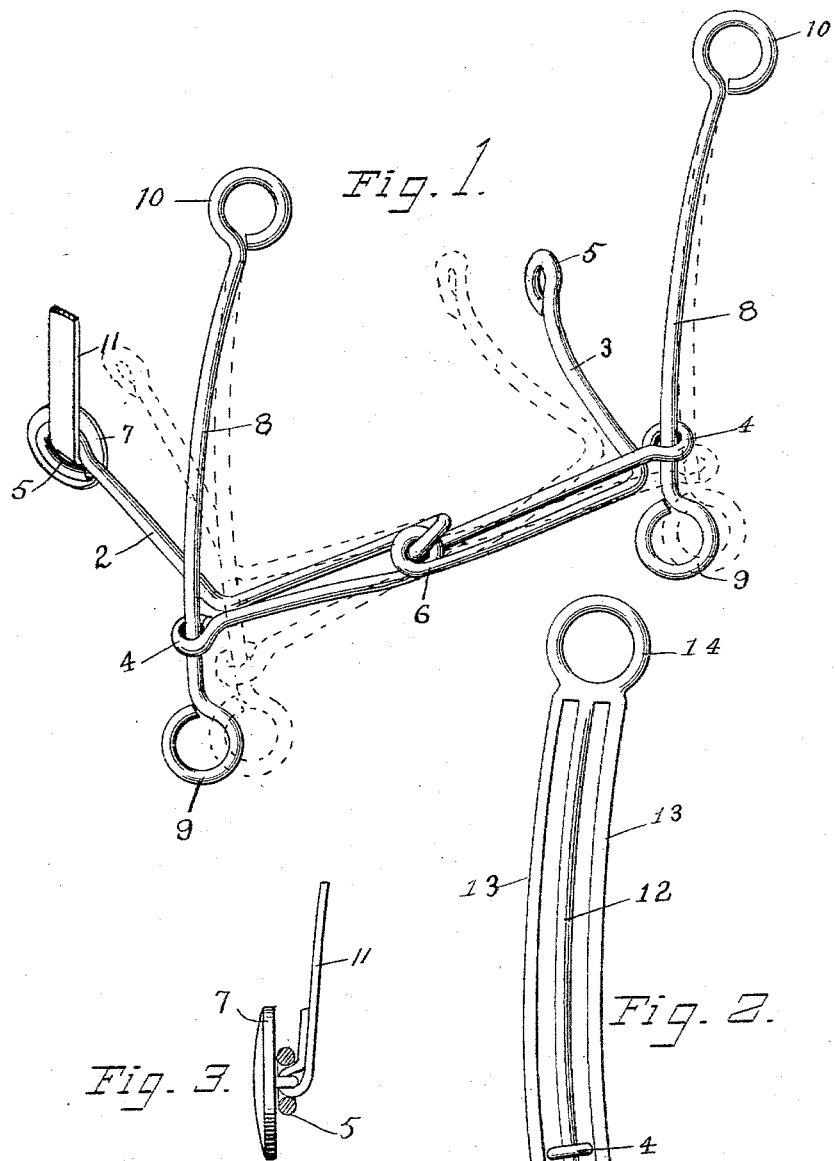
Witnesses
B. P. Shepherd
Richard Paul
Inventor
Israel Harmanson
By Paul O Hawley
his attorneys
THE NORRIS PETERS CO., PHOTO-LITHO., WASHINGTON, D. C.

UNITED STATES PATENT OFFICE.

ISRAEL HARMANSON, OF HOPKINS, MINNESOTA, ASSIGNOR OF ONE-THIRD TO ANDREW G. BERGSTROM, OF SAME PLACE.

BRIDLE-BIT.

SPECIFICATION forming part of Letters Patent No. 571,563, dated November 17, 1896.

Application filed February 17, 1896. Serial No. 579,539. (No model.)

*To all whom it may concern:*

Be it known that I, ISRAEL HARMANSON, of Hopkins, Hennepin county, State of Minnesota, have invented certain new and useful Improvements in Bridle-Bits, of which the following is a specification.

My invention relates to bridle-bits, and the object I have in view is to provide a bit by means of which a vicious or unruly horse may be easily controlled from running away at any time.

A further object is to provide a bit of a very simple and economical construction which can be readily attached to an ordinary bridle.

My invention consists generally in providing two bars crossed near their central portion and pivotally connected at that point, said bars being provided at one end with a button or other suitable device to bear upon the nostril of the horse, in combination with vertically-movable side bars to which the reins are connected, all as hereinafter described, and particularly pointed out in the claim.

The invention will be more readily understood by reference to the accompanying drawings, forming part of this specification, and in which—

Figure 1 is a perspective view of a bit embodying my invention. Fig. 2 is a plan view of one of the side bars slightly modified in construction. Fig. 3 is an edge view of the button which bears upon the nostril of the horse.

In the drawings, 2 and 3 represent bars which form the main portion of the bit and which are provided at each end with loops 4 and 5 and near their central portion with the loops 6. The loops 6 are pivotally connected and are within the horse's mouth when the bit is in use. The end of the bars which are provided with the loops 5 are bent at right angles to the main portion of the bars, so that when the bit is placed in the horse's mouth these ends will project forward and bring the loops 5 at a point opposite the nostrils of the horse. Each loop is provided upon its inner surface with a button 7, of leather or other suitable material. Within the loops 4 I provide the vertically-movable bars 8, provided at each end with loops 9 and 10. The loops 10 are connected with the side straps of the headdraw, and by means of which the bit is held in position in the horse's mouth. Straps 11 are connected to the loops 5 on the opposite end of the bars 2 and 3, and these straps are connected to the overdraw-check ring. The reins are connected to the loops 9, and when it is desired to check the horse by simply drawing in on the reins the bars 2 and 3 will be moved to the position indicated by dotted lines in Fig. 1, and as the tension on the lines increases the bars 8 will slide down within the loops 4, thereby increasing the leverage in proportion to the increasing tension on the reins. As the forward end of the bars are brought nearer together the buttons 7 will press upon the nostrils of the horse, thereby preventing the animal from breathing and quickly bringing him to a standstill. In place of the bars shown in Fig. 1, I may provide a bar such as I have shown in Fig. 2, which consists of the main portion 12, which slides within the loop 4 in the same manner as the bars 8, and upon each side of this bar I provide ornamental bars 13, which, while having nothing to do with the operation of the bit, adds very materially to its appearance. At each end of the bar 12 I provide loops 14, corresponding to those pivoted at each end of the bars 8.

Having thus described my invention, I claim as new and desire to secure by Letters Patent—

A bridle-bit comprising two bars or rods forming the main portion thereof, each having one end bent at substantially right angles to the other, and arranged to project forward beyond the main portion of the bit, the ends of said bent portions being provided with loops through which pass the straps from the checkrein, the bars arranged to slide vertically in loops provided in the ends of the main portions of said bit, said bars being provided with looped ends, and the bars forming the main portion of said bit being provided with interlocking loops, for the purpose set forth.

In testimony whereof I have hereunto set my hand this 7th day of January, A. D. 1896.

ISRAEL HARMANSON.

In presence of—
RICHARD PAUL,
JEANETTE GOOLEY.